United States Patent

Rubin

Patent Number: 5,416,956
Date of Patent: May 23, 1995

[54] DETACHABLE ANCHOR LOOP

[76] Inventor: Larry M. Rubin, P.O. Box 2569, San Diego, Calif. 92112

[21] Appl. No.: 226,401

[22] Filed: Apr. 12, 1994

Related U.S. Application Data

[63] Continuation of Ser. No. 868,882, Apr. 16, 1992, abandoned.

[51] Int. Cl.⁶ .................. A44B 13/00; B61D 45/00
[52] U.S. Cl. .................... 24/601.4; 24/199; 24/600.9; 410/116
[58] Field of Search .............. 24/601.4, 600.9, 197, 24/199, 3 K; 410/110, 116, 115, 65, 106, 107

[56] References Cited

U.S. PATENT DOCUMENTS

| | | | |
|---|---|---|---|
| 422,801 | 3/1890 | Kennedy | 24/600.9 |
| 688,451 | 12/1901 | Warner | 24/199 |
| 991,795 | 5/1911 | Moore | 24/199 |
| 1,295,190 | 2/1919 | Morrison | 24/3 K |
| 1,332,014 | 2/1920 | Wilson | 24/3 K |
| 1,532,613 | 4/1925 | Valcourt | 24/600.9 |
| 1,709,053 | 4/1929 | Anderson | 24/600.9 |
| 2,930,330 | 3/1960 | Jensen et al. | 410/107 |
| 3,688,349 | 9/1972 | Benk | 24/601.4 |
| 4,107,823 | 8/1978 | Siesto | 24/3 K |
| 4,484,380 | 11/1984 | Redi | 24/601.4 |
| 4,818,162 | 4/1989 | Bukowski et al. | 410/106 |
| 4,850,770 | 7/1989 | Millar, Jr. | 410/116 |

FOREIGN PATENT DOCUMENTS 0008234 of 1894 United Kingdom ............ 24/601.4

*Primary Examiner*—Victor N. Sakran
*Attorney, Agent, or Firm*—Thomas J. Tighe

[57] ABSTRACT

A ring to which things can be tied, hooked or otherwise linked is pivotally affixed to the end of an elongated shank. At the opposite end of the shank is a wide hook, preferably as wide as the connecting ring. Integral with the shank is a leaf member which protrudes into the hollow of the hook. The leaf member and tongue of the hook are biased toward each other. The hook is used to catch a rigid planar lip of a structure. The biasing causes the lip to be clamped between the leaf member and hook tongue to hold the device in place. The hook is oriented so that any tension applied to the connecting ring is counteracted by force against by the hook by the rigid planar lip. Things connected to the ring are thereby anchored by the structure.

17 Claims, 2 Drawing Sheets

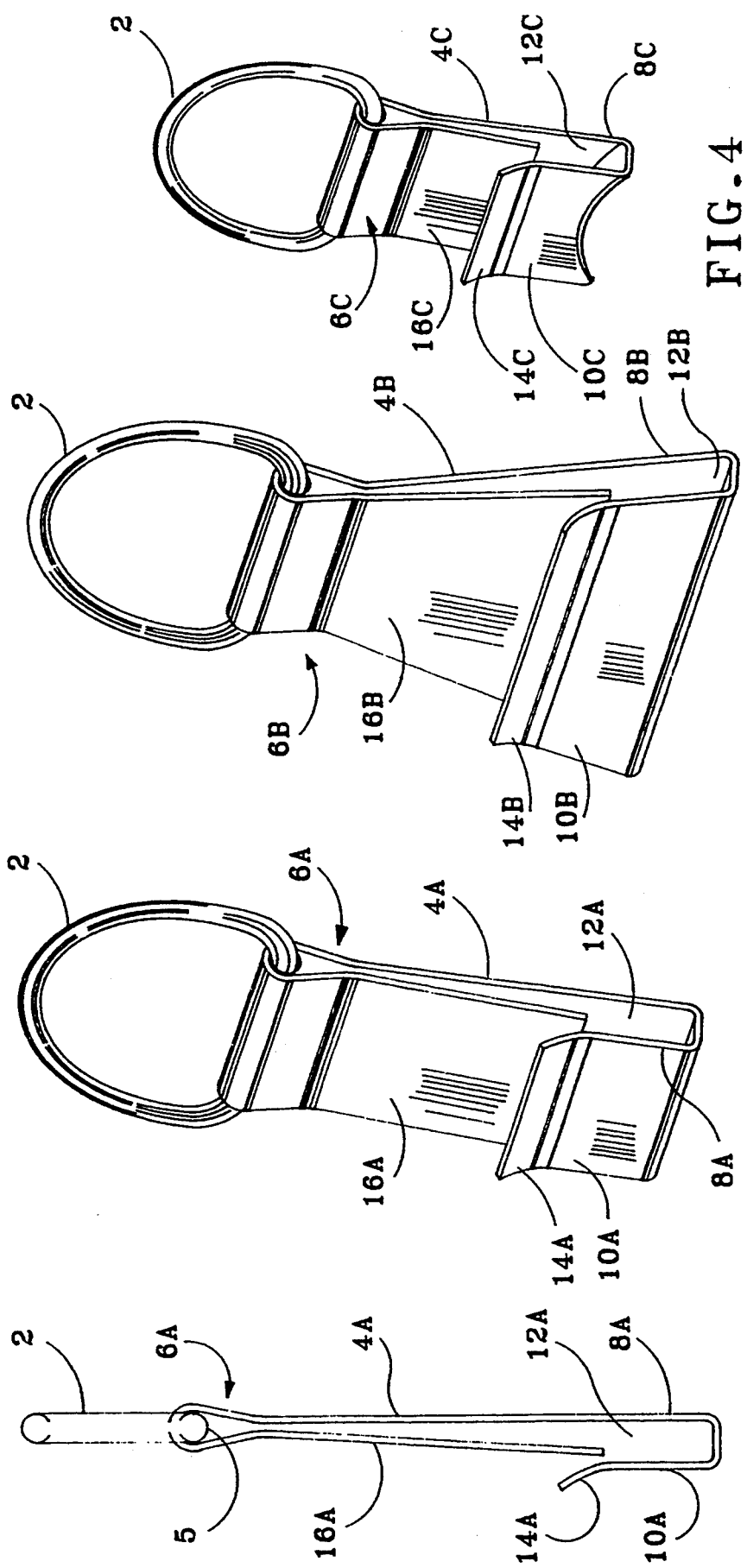

DETACHABLE ANCHOR LOOP

This application is a continuation of Ser. No. 07/868,882 filed Apr. 16, 1992, abandoned.

BACKGROUND OF THE INVENTION

This invention relates to devices which can be easily and quickly attached to, and detached from, a rigid lip of a structure in order to provide a loop to which things can be tied, hooked or otherwise linked for being anchored to the structure.

There are numerous situations where it is desirable to secure something to a loop affixed to a structure in order to use the structure as an anchoring device, but where no such loop is available. For example, at times it is necessary or useful to secure a load of cargo in the bed of a pickup truck. It would be advantageous to have loops affixed to the sides of the truck bed so that the load could be secured by ropes tied to or through the loops. Unfortunately most pickup trucks are not made to have such anchor loops. Other conventional means for attaching the rope to the truck bed are often unavailable or not ideally located.

For another example, it is usually necessary to secure the lid of an automobile trunk by means of a rope, cord, tie-strap or the like when the contents of the trunk prevent the lid from latching or closing completely. In some kinds of automobiles the trunk lid and/or latch have an aperture through which a rope can be looped and tied, or to which a strap can be hooked. But there are a significant number of automobiles with trunks that do not have such convenient apertures and there is no good way to attach a cord, or the like, to secure the trunk lid.

Although the above examples pertain to vehicles, the need for, and the advantages of, the invention as described herein exist in non-vehicular circumstances. They exist wherever and whenever it is necessary or desirous to tie, hook, link or otherwise connect something to a structure which has no means to do so but which has a rigid lip.

Other advantages of this invention will be apparent upon a reading of the text hereinafter.

SUMMARY OF THE INVENTION

An object of this invention is to provide a means for attaching a loop to a rigid lip of a structure in order to use the loop to tie, hook, link or otherwise connect things to the structure.

Another object of this invention is to provide a means as described in the preceding paragraph that is simple and easy to attach and detach.

Another object of this invention is to provide a means for attaching a loop to a cargo bed having a rigid lip in order to use the loop to tie, hook, link or otherwise secure things in the cargo bed.

Another object of this invention is to provide a means for attaching a loop to a truck bed wall having a rigid lip in order to use the loop to tie, hook, link or otherwise connect things to the wall.

Another object of this invention is to provide a means for attaching a loop to a lid of an automobile trunk having a rigid lip in order to use the loop to tie, hook, link or otherwise connect things to the trunk lid.

Other objects of this invention will be discussed hereinafter or will be readily discernable from a reading of the text herein.

These objects are accomplished by a device for connecting something to a structure having a rigid planar lip comprising a shank means, a ring to which things can be connected affixed to the shank means, and means for detachably connecting the shank means to the rigid planar lip. The means for detachably connecting the shank means to the rigid planar lip can comprise means integral with the shank means for hooking the lip, and means for clamping onto the lip. The means for hooking the lip can comprise a hook at an end of the shank and the means for clamping onto the lip can comprise a leaf member integral with the shank means biased toward a tongue of the hook, the rigid planar lip of the structure being clamped between the hook's tongue and the leaf member.

BRIEF DESCRIPTION OF THE DRAWINGS

FIG. 1 is a side view of a first embodiment of this invention.

FIG. 2 is a perspective view of the first embodiment as illustrated in FIG. 1.

FIG. 3 is a perspective view of a second embodiment of this invention.

FIG. 4 is a perspective view of a third embodiment of this invention.

DESCRIPTION OF THE PREFERRED EMBODIMENT

Referring to FIGS. 1 and 2, a first embodiment of this invention is illustrated to have a "D" ring 2 to which things can be connected (e.g. tied, hooked or otherwise linked) pivotally affixed to an end of an elongated shank 4. As illustrated, the shank can be formed from a single strap of metal and the straight portion 5 of the D ring is affixed to the shank by a crimped fold, generally designated 6, in the metal strap that unbindingly encircles said straight portion of the D ring. The metal strap can be steel having sufficient resilience and shape memory to produce a clamping action as described below. For example, the metal strap can be 18 gauge stainless or galvanized steel, and the D ring can be 5/16 of an inch steel.

Referring again to FIGS. 1 and 2, at an end of the shank 4A opposite the D ring is a hook 8A. As illustrated, the hook is formed by a generally "U" shaped bend at the end of the metal strap. The hook comprises a tongue 10A which is that portion of the metal strap that has been folded back upon itself and a hollow 12A which is the valley defined by the bend itself. While most of the hook's tongue is generally parallel with the shank, a terminal portion 14A of the tongue preferably flares outward for more ease in hooking. Preferably the material forming the hook is generally at least as wide as the straight portion of the D ring is long. This width provides not only additional strength but also increases lateral stability.

Referring again to FIGS. 1 and 2, a leaf member 16A is illustrated to intrude into the hook's hollow 12A at least to the extent that there is some overlap between the leaf member and the hook's tongue, exclusive of the tongue's flared terminus. A biasing means urges the leaf member and the tongue of the hook to be closed together or only slightly spaced apart (as illustrated if FIG. 1). Thus anything of sufficient width interposed between the tongue and the leaf member will be clamped between the two. Preferably the leaf member is an extension of the metal strap from the D ring fold 6A to a point within the hollow 12A of the hook 8A. Thus, as the crimped fold 6A is formed the leaf member 16A is created. Preferably the biasing means comprises a memory in the crimped fold which urges the leaf member and shank to flare apart, and this in turn causes the leaf member and the hook's tongue to come together. A purpose of the clamping action is to keep the device attached to a planar lip by friction and hold it in place relative to the planar lip at least until tension is applied to the device as described below.

Figures 5, 6:
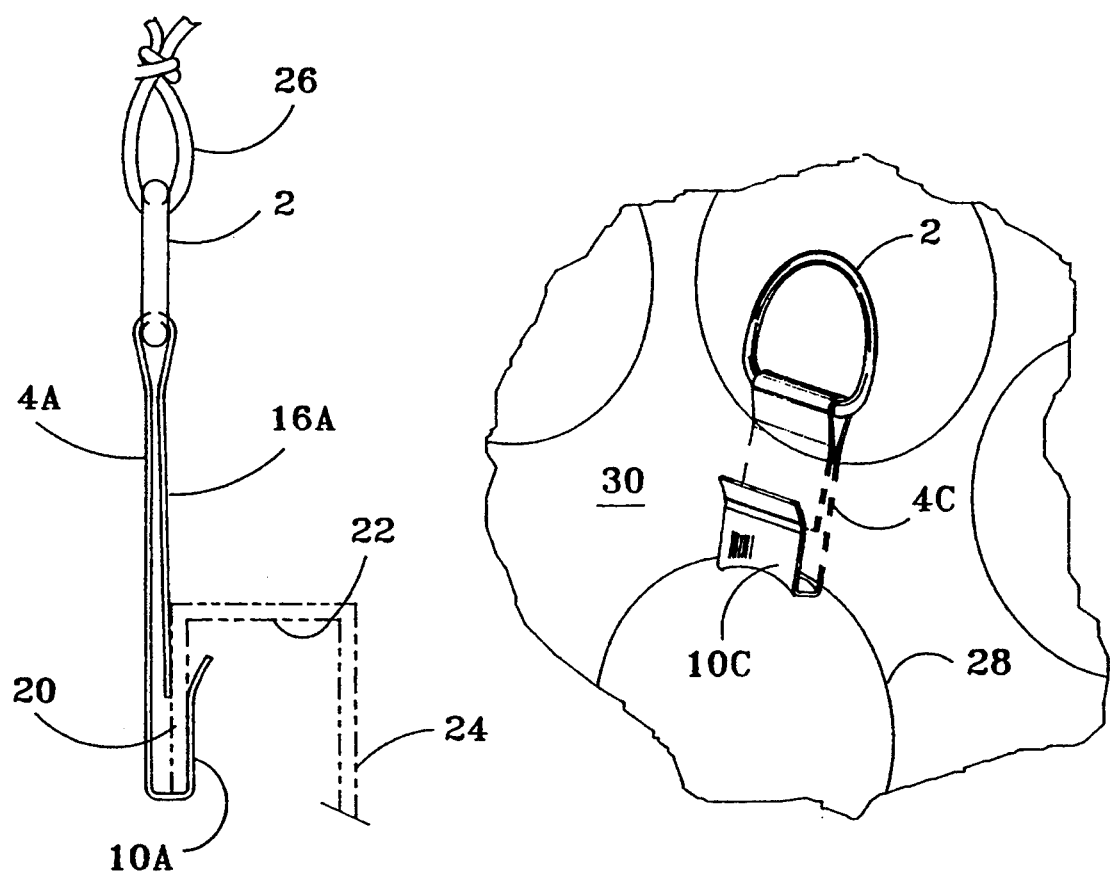
FIG. 5 is a side view of the first or second embodiment of this invention in operation.
FIG. 6 is a pictorial view of the third embodiment of this invention attached to the lip of a hole in a rigid planar structure.

The clamping action is illustrated more clearly in FIG. 5 wherein a rigid planar lip 20 (shown in phantom lines) is clamped against the tongue 10A by the biasing means. The lip 20 is the terminal portion of a U channel 22 formed by supplementary angle folds along the margin of a structure 24. Such a channel is typical found at and along the top margins of the sidewalls of pickup truck beds.

Also illustrated by FIG. 5 is a cord or rope 26 tied to the D ring 2. It should be noted that the hook portion of the shank is so oriented in relation to the D ring that any tension exerted by the rope on the D ring is counteracted by the force exerted against the hook by the margin of the planar lip 22, at least within the structural limitations of the elements in the tension line. Once enough tension is applied to the device, the tension will tend to keep the device attached to the planar lip. It should be noted that the length of the hook's tongue 10A, i.e. the depth of the hook's hollow, can be sized so as not to exceed the operational width of a lip for which it is intended.

Referring to FIG. 3, a second embodiment of the invention is illustrated also having a D ring 2, a shank 4B, a crimped fold 6B by which the D ring is pivotally affixed to the shank, a hook 8B having a tongue 10B and a hollow 12B, and a leaf member 16B. In this embodiment the base of the hollow 12B of the hook 8B is relatively wider than in the first embodiment. The base of the hollow is substantially wider than the connecting ring in order to further improve the stability of this embodiment against lateral rotation. The shank 4B is illustrated to be tapered in width, being smallest at the fold 6B around the D ring and largest at the base of the hollow.

Referring to FIGS. 4 and 6, a third embodiment of this invention is illustrated also having a D ring 2, a shank 4C, a crimped fold 6C by which the D ring is pivotally affixed to the shank, a hook 8C having a tongue 10C and a hollow 12C, and a leaf member 16C. In this embodiment the base of the hook hollow is laterally concavely arcuate. As illustrated in FIG. 6, this embodiment can be attached to the lip of a circular aperture 28 in a rigid planar structure 30. The curvature of the hollow base can be seen to better match the curved lip of the aperture for distributing the counteractive force of the lip more evenly along the hollow base and for providing increased stability.

This third embodiment is particularly useful to tie down automobile trunk lids. Most trunk lids have an infrastructure of beam-like crosspieces for buttressing the form of the outside skin of the trunk lid. Typically these crosspieces are formed from sheet metal and define holes at least some of which are spaced from the underside of the trunk lid skin, apparently to save metal and/or reduce the weight of the trunk lid. These holes spaced from the skin can be said to be defined by rigid margins of the sheet metal, i.e. rigid lips of the infrastructure and are typically round or rounded.

Figure 7:
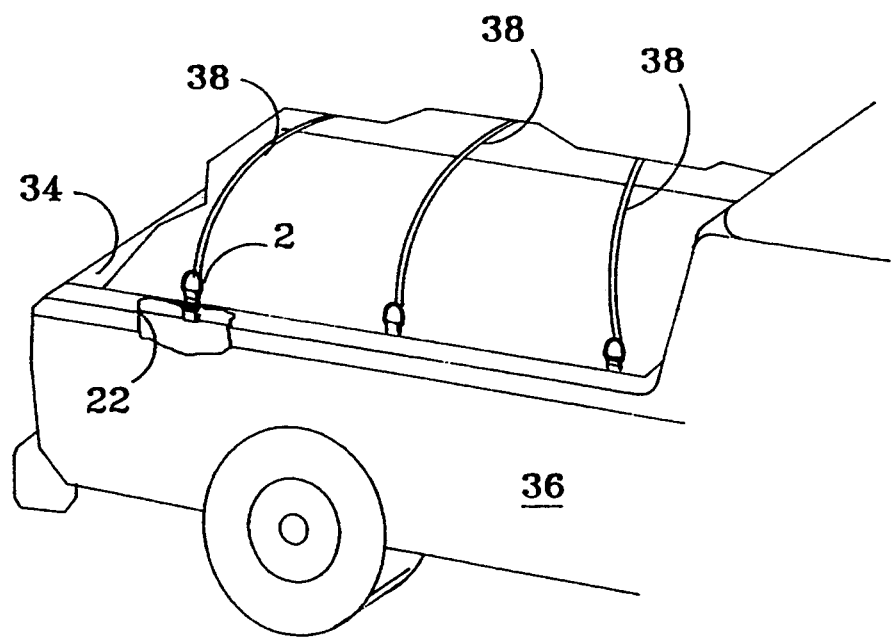
FIG. 7 is a pictorial view of a plurality of first embodiments of this invention being used to anchor cargo tie-down cords to a wall of a bed of a pickup truck.

Referring to FIGS. 5 and 7, illustrated is an example of this invention being used to secure a cargo 32 in a pickup truck bed 34. The channel fold 22 of FIG. 5 is found along the interior of the top of the walls 36 surrounding the bed of the truck of FIG. 7 and rope or a like material 38 is illustrated to be looped through or tied to a plurality of devices according to this invention to secure the cargo.

To avoid scratching or scraping a planar lip to which this device attaches, the entire shank, including the hook and the leaf member can be coated in rubber or a rubber-like substance.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

I claim:

1. A device for connecting objects to a structure having a rigid planar lip comprising:
    (a) an elongated planar strip having on a common side a first fold back upon itself at one end forming a hook and a second fold back upon itself at the opposite end forming a leaf, the leaf extending from the second fold into a mouth of the hook,
    (b) a ring pivotally affixed to the strip by a crimp in the second fold, the crimp closing said fold about a segment of the ring disposed therein sufficiently to confine the ring, the ring being for attaching said objects to the folded planar strip, and
    (c) a memory in the second fold urging said fold to open causing the leaf to press against an inside surface of a folded-back portion of the hook, the planar lip being clamped between the leaf and said folded-back portion of the hook when connecting the device to the planar lip.

2. The device according to claim 1 wherein a base of the hollow of the hook generally conforms to the an edge of the planar lip for more even distribution of forces counteractive to any pulling tension applied to the ring.

3. The device according to claim 1 wherein the base of the hollow of the hook is substantially wider than the ring for added stability.

4. A device for connecting things to a structure having a rigid planar lip comprising:
    (a) shank means,
    (b) ring means, affixed to the shank means, for connecting things thereto, and
    (c) means for detachably connecting the shank means to the rigid planar lip comprising:
    (1) a hook, integral with the shank means, for hooking the lip, the hook having a tongue,
    (2) a leaf member integral with the shank means, and
    (3) biasing means urging the leaf member toward the tongue of the hook, the rigid planar lip of the structure being clamped between the tongue and the leaf member by force of the biasing means.

5. The device according to claim 4, wherein the shank means is a strap and the ring means is affixed to the shank means by a crimped fold in the strap which unbindingly encircles a portion of the ring means.

6. The device according to claim 5 wherein the leaf member comprises an extension of the strap beyond the fold, and wherein the biasing means comprises a memory in the strap which urges the leaf member and the shank means to flare apart.

7. The device according to claim 4, wherein a marginal portion of the tongue of the hook means is curved away from the leaf member, so as to more easily insert the rigid planar lip.

8. The device according to claim 4 wherein the hook is wider than the ring means for added stability.

9. The device according to claim 4 further comprising coatings of a material at least on surfaces of the hook tongue and leaf member that come in contact with the rigid planar lip during use, the material being soft enough to prevent scratching of the rigid planar lip by the coatings.

10. The device according to claim 4 wherein the hook is laterally arcuate for generally conforming to rigid planar lips that have correspondingly arcuate edges.

11. The device according to claim 4 wherein a base of the hollow of the hook generally conforms to an edge of the planar lip for more even distribution of forces counteractive to any pulling tension applied to the ring means.

12. A device for connecting things to a structure having a rigid planar lip comprising:
(a) a metal strap,
(b) ring means, affixed to the metal strap by a crimped fold in the metal strap which unbindingly encircles a portion of the ring means, for connecting things thereto,
(c) hook means, integral with the metal strap, for hooking the lip, the hook means having a tongue, and
(d) biasing means, connected to the metal strap and extending into said hook means, for clamping the lip between the tongue of the hook means and said biasing means, said biasing means comprising a leaf that is an extension of the metal strap beyond the fold and a memory in the metal strap which urges the leaf and the metal strap to flare apart.

13. The device according to claim 12, wherein a marginal portion of the tongue of the hook means is curved away from the leaf, so as to more easily insert the rigid planar lip.

14. The device according to claim 12 wherein the hook means is generally as wide as the ring means.

15. The device according to claim 12 wherein the hook means is wider than the ring means for added stability.

16. The device according to claim 12 further comprising coatings of a material at least on the surfaces of the tongue and the leaf that come in contact with the rigid planar lip during use, the material being soft enough to prevent scratching of the rigid planar lip by the coatings.

17. The device according to claim 12 wherein a hollow of the hook means conforms to an edge of the lip being hooked for more even distribution of forces counteractive to any pulling tension applied to the ring means.

* * * * *